United States Patent

[11] 3,572,466

[72] Inventors Felix Hom
 La Mesa;
 George E. Medawar, San Diego, Calif.
[21] Appl. No. 869,194
[22] Filed Oct. 24, 1969
[45] Patented Mar. 30, 1971
[73] Assignee Rohr Corporation
 Chula Vista, Calif.

[54] APPARATUS FOR AUGMENTING THRUST AND SUPPRESSING NOISE OF JET ENGINE
2 Claims, 2 Drawing Figs.

[52] U.S. Cl. .................................................. 181/51,
 239/127.3, 239/265.17
[51] Int. Cl. .................................................... B64d 33/06,
 F01n 1/14
[50] Field of Search ............................................ 181/33, 43,
 51, 33.22, 33.221, 33.222; 239/127.3, 265.17,
 265.11, 265.13

[56] References Cited
UNITED STATES PATENTS
3,002,341 10/1961 Muzzy et al. .................. 181/33.221
FOREIGN PATENTS
1,157,063 12/1957 France ......................... 181/33.221
865,838 4/1961 Great Britain ................. 181/33.221

Primary Examiner—Robert S. Ward, Jr.
Attorney—George E. Pearson

ABSTRACT: A tubular ejector is coaxially spaced around the aft end of an aircraft housing containing a jet engine so that slipstream air flows in annular stream around thrust gas discharged from the engine. Tubes are connected at one end thereof to edges of openings spaced around periphery of the engine housing and at other end thereof to edges of openings spaced around periphery of a hollow ring coaxially mounted within said housing, so that slipstream air also enters tubes and is discharged into central portion of the thrust gas through a slot in the aft end of ring.

Patented March 30, 1971

3,572,466

INVENTOR.
FELIX HOM
GEORGE E. MEDAWAR

BY Edwin D. Grant
ATTORNEY

APPARATUS FOR AUGMENTING THRUST AND SUPPRESSING NOISE OF JET ENGINE

SUMMARY OF THE INVENTION

This invention relates to jet-propelled aircraft and more particularly to a nozzle and ejector arrangement for suppressing the noise generated by exhaust gas streams of such aircraft while augmenting the thrust thereof.

Part of the noise associated with the operation of a jet-propelled aircraft results from the flow through the atmosphere of the high velocity, high temperature exhaust gas which is discharged from the engine, or engines, thereof. The amount of noise so generated by streams of jet-engine exhaust gas is proportionate to their temperature and velocity. In accordance with the present invention, atmospheric air is mixed with exhaust gas of a jet engine (or exhaust gas and fan air, in aircraft which utilize turbofan engines) at the point where said gas is discharged to the atmosphere, thereby forming a jet stream the temperature and velocity of which are respectively lower than the temperature and velocity of the exhaust gas itself. The noise of the stream of combined air and exhaust gas is thus less than that which would be generated if the exhaust gas were discharged to the atmosphere as a separate stream. More specifically, in a preferred embodiment of the present invention a cylindrical ejector is positioned around and extends rearwardly from the aft end of a tubular member containing a jet engine, said member being either the fuselage of an aircraft or an engine nacelle thereof and thrust gas of said engine being discharged from said tubular member and through the ejector in a stream which is surrounded by slipstream air flowing past the tubular member and into said ejector. Apertures extend through and are spaced apart around the aft end of the wall of the tubular member, and tubes are respectively joined to the edges of these apertures and extend inwardly and rearwardly from said wall into the stream of thrust gas flowing through said tubular member. Mounted on the inner ends of the aforesaid tubes and coaxially disposed relative to the tubular member and ejector is a hollow ring having a circular slot formed in the aft end thereof, apertures extending through the wall of the ring at the points where the tubes are joined thereto. Slipstream air flows through the tubes to the interior of the ring, and then through the slot in the latter into the thrust gas. Hence apparatus arranged in accordance with the present invention not only suppresses the noise of an aircraft jet stream by mixing air therewith to lower its temperature and velocity, but also augments the thrust produced by said stream by means of ejector action.

DETAILED DESCRIPTION

The drawings illustrate the frustoconical aft portion of a tubular member 10 which may be an aircraft fuselage or nacelle containing a jet engine (not illustrated), or a jet engine tailpipe which is exposed to the atmosphere at its aft portion. A tubular, frustoconical ejector 12 is mounted in coaxial relation with the aforesaid tubular member at the aft end thereof and extends downstream therefrom, the forward edge of said ejector being located upstream from the aft end of said member and spaced from the outer surface thereof. More particularly, three struts 14A—14C are immovably attached to the outer surface of member 10 and to the inner surface of the ejector, these struts being evenly spaced apart around said member, and the aft edge 16 of the latter and the forward and aft edges 18, 20 of the ejector lie in planes disposed perpendicular to the common longitudinal axis of said member and ejector.

Figure 1:
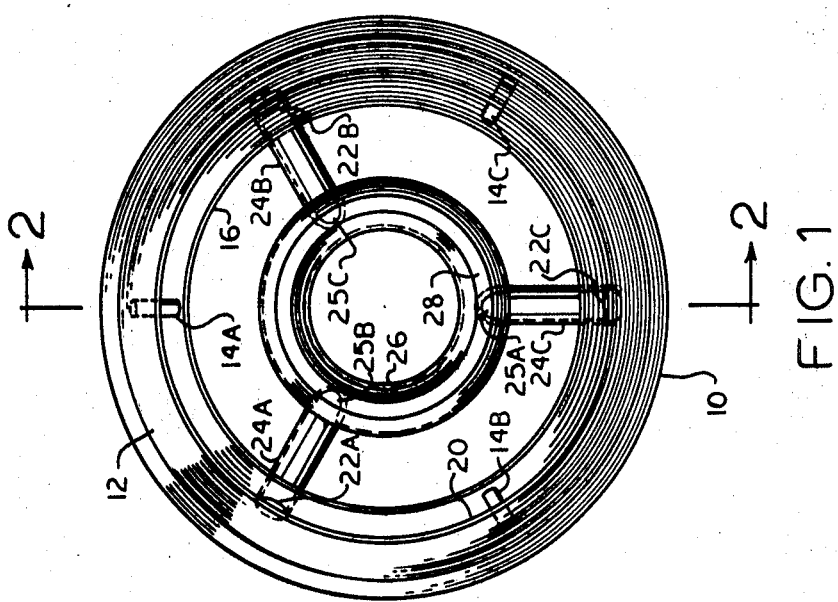
FIG. 1 is a rear elevation of the preferred embodiment of the invention.

Three apertures 22A—22C extend through the wall of the tubular member 10 adjacent its aft end, these openings being evenly spaced apart circumferentially of said member and equidistant from said aft end thereof. Three tubes 24A—24C are respectively attached to the edges of these apertures and extend inwardly and rearwardly therefrom. The inner ends of the tubes are respectively attached to the edges of three apertures 25A—25C which extend through the forward portion of the wall of a hollow ring 26 coaxially disposed within member 10 adjacent the aft end thereof. As can be seen in FIG. 1, a circular slot 28 is formed in the aft end of the ring.

OPERATION

Figure 2:
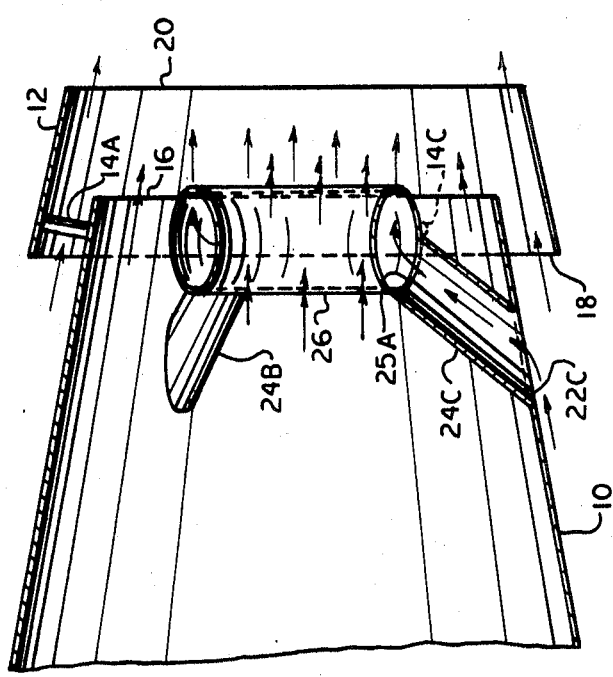
FIG. 2 is a longitudinal sectional view of the same apparatus, taken along the plane represented by line 2-2 in FIG. 1 and in the direction indicated by arrows therein.

During the flight of an aircraft equipped with the above-described apparatus, slipstream air (represented by single-headed arrows in FIG. 2) flows through the space between member 10 and ejector 12 and thence around the stream of thrust gas (represented by double-headed arrows in the same drawing) which is discharged through said member and said ejector. Slipstream air also enters tubes 24A—24C and flows therethrough to the interior of ring 26, from whence it flows through slot 28 into the stream of thrust gas. Thus cool, relatively low velocity air is mixed with the hot, high velocity thrust gas and effects both sound suppression and thrust augmentation as explained hereinbefore.

When the invention is used in connection with an aircraft propelled by a turbofan engine, both fan air and primary exhaust gas of the engine are preferably discharged through tubular member 10. For the purpose of interpretation of claims appended hereto, the term "thrust gas" is thus to be considered as applying to either exhaust gas alone or a mixture of exhaust gas and fan air.

It will be recognized that details of construction of the disclosed sound suppressing and thrust augmenting apparatus can be varied without departing from the basic principle of its operation. Hence the scope of the invention should be considered to be limited only by the terms of the appended claims.

We claim:

1. In an aircraft having a jet engine, the combination comprising: a tubular member through which thrust gas of said engine is discharged, at least the aft portion of said tubular member being exposed to the atmosphere so that slipstream air flows past the outer surface thereof during the flight of said aircraft, at least one aperture being formed in the wall of said tubular member adjacent the aft end thereof; a tubular ejector fixedly positioned in substantially coaxial relation with said tubular member and extending downstream therefrom, the forward edge of said ejector being spaced outwardly from the aft edge of said tubular member so that slipstream air enters the ejector in a substantially annular stream surrounding said thrust gas; and conduit means communicatively connected to said aperture in said tubular member and extending into said thrust gas, slipstream air flowing through said conduit means and discharging into said thrust gas.

2. The combination defined in claim 1 wherein said conduit means comprises a hollow ring substantially coaxially disposed within the aft end of said tubular member, said ring having a plurality of apertures spaced about the periphery thereof and a slot extending circumferentially around the aft end thereof; and a plurality of tubes the ends of which are respectively communicatively connected to said apertures in said ring and to apertures in the wall of said tubular member adjacent the aft end thereof.